(12) United States Patent
Zeuschner

(10) Patent No.: US 10,561,116 B2
(45) Date of Patent: Feb. 18, 2020

(54) CUTTING OF A SOFT FOOD MASS

(71) Applicant: Hochland Natec GmbH, Heimenkirch (DE)

(72) Inventor: Roland Zeuschner, Argenbuehl (DE)

(73) Assignee: Hochland Natec GmbH, Heimenkirch (DE)

( * ) Notice: Subject to any disclaimer, the term of this patent is extended or adjusted under 35 U.S.C. 154(b) by 778 days.

(21) Appl. No.: 14/976,834

(22) Filed: Dec. 21, 2015

(65) Prior Publication Data

US 2016/0278337 A1 Sep. 29, 2016

Related U.S. Application Data

(62) Division of application No. 12/810,625, filed as application No. PCT/EP2008/067951 on Dec. 18, 2008, now Pat. No. 9,237,738.

(30) Foreign Application Priority Data

Dec. 27, 2007 (DE) ........................ 10 2007 063 295

(51) Int. Cl.
*A01J 27/04* (2006.01)
*B26D 1/143* (2006.01)

(52) U.S. Cl.
CPC ............ *A01J 27/04* (2013.01); *B26D 1/1435* (2013.01); *B26D 2210/02* (2013.01); *Y10T 83/04* (2015.04)

(58) Field of Classification Search
CPC ... A01J 27/04; B26D 1/1435; B26D 2210/02; Y10T 83/04
See application file for complete search history.

(56) References Cited

U.S. PATENT DOCUMENTS 1,909,029 A * 5/1933 Walter ................. B26D 1/0006
19/0.3
2,281,264 A * 4/1942 Bruno ..................... B02C 19/20
241/295

(Continued)

FOREIGN PATENT DOCUMENTS

DE 548097 C 4/1932
DE 262127 A3 11/1988

(Continued)

OTHER PUBLICATIONS

Invitation to hearing at Patent Office of the Government of India in Patent Application No. 1169/MUMNP/2010, which is a patent family member of U.S. Appl. No. 14/976,834, dated Nov. 15, 2018.

*Primary Examiner* — Steven N Leff
(74) *Attorney, Agent, or Firm* — Robert S. Lelkes

(57) ABSTRACT

Method and device for cutting a soft food mass, in particular for cutting machine-processed cheese, such as processed cheese or mozzarella, whereby the food mass is present as a broad food ribbon of small ribbon thickness, whereby the food ribbon is fed by means of a conveyor belt with a travel speed leading to a longitudinal cutting system, in particular in the form of a cutting roller, which cuts the food ribbon with axially arranged cutting disks into parallel longitudinal strips, whereby the direction of rotation of the longitudinal cutting system corresponds to the travel direction of the food ribbon, whereby the cutting disks in each case have blades that are provided with at least one tooth, whereby the tooth height is greater than the ribbon thickness, whereby the peripheral speed of the cutting roller is adjusted in such a way that a tooth is immersed in the food ribbon when cutting with the tips of the teeth and creates a slot of a specific slot (Continued)

length in the food ribbon that moves in the same direction, whereby the slot created by the subsequent tooth is adjacent to the preceding slot.

10 Claims, 3 Drawing Sheets

(56) References Cited

U.S. PATENT DOCUMENTS

| | | | | |
|---|---|---|---|---|
| 2,605,723 A * | 8/1952 | Rhodes | ............... | A21C 3/02 425/321 |
| 2,887,964 A * | 5/1959 | Griner | ............... | A21C 11/04 425/289 |
| 2,907,109 A * | 10/1959 | Palmer | ............... | A01J 27/04 425/224 |
| 3,152,500 A * | 10/1964 | Watts | ............... | B26D 7/18 83/302 |
| 3,225,717 A * | 12/1965 | Page | ............... | A21C 3/06 425/320 |
| 3,245,300 A * | 4/1966 | Hasten | ............... | B26D 1/36 83/355 |
| 3,318,266 A * | 5/1967 | Rich | ............... | A21C 11/12 29/6.2 |
| 3,479,024 A * | 11/1969 | Olson | ............... | B65B 35/54 198/449 |
| 3,887,719 A * | 6/1975 | Miller | ............... | A01J 25/114 426/414 |
| 3,900,574 A * | 8/1975 | Warwick | ............... | A01J 27/04 426/273 |
| 4,273,013 A * | 6/1981 | Artin | ............... | B26D 1/15 83/167 |
| 4,307,843 A * | 12/1981 | Loiseau | ............... | B26D 9/00 241/101.1 |
| 4,583,435 A | 4/1986 | Fessler | | |
| 4,837,382 A * | 6/1989 | Ruegg | ............... | A21C 3/10 425/294 |
| 4,849,234 A * | 7/1989 | Spinelli | ............... | A21C 3/02 426/231 |
| 5,129,299 A | 7/1992 | Fischer et al. | | |
| 5,151,024 A * | 9/1992 | Hayashi | ............... | A21C 3/025 425/141 |
| 5,152,469 A * | 10/1992 | Dicky | ............... | B02C 18/142 241/166 |
| 5,573,805 A | 11/1996 | Fager et al. | | |
| 5,601,855 A | 2/1997 | Fager et al. | | |
| 5,988,033 A * | 11/1999 | Skaar | ............... | B26D 1/0006 83/342 |
| 6,045,840 A * | 4/2000 | Morikawa | ............... | A21C 3/04 425/135 |
| 6,196,097 B1 | 3/2001 | Handel | | |
| 6,378,455 B1 | 4/2002 | Postma et al. | | |
| 6,524,090 B1 * | 2/2003 | Hayashi | ............... | A21C 3/02 425/140 |
| 6,540,218 B2 | 4/2003 | Tsukada et al. | | |
| 6,579,550 B1 | 6/2003 | Baur | | |
| 7,223,431 B2 * | 5/2007 | Owens | ............... | A01J 27/04 241/24.26 |
| 2003/0183709 A1 | 10/2003 | Greenlaw | | |
| 2004/0009253 A1 * | 1/2004 | Hayashi | ............... | A21C 3/02 425/208 |
| 2004/0086602 A1 | 5/2004 | Oka | | |
| 2004/0101611 A1 * | 5/2004 | Spinelli | ............... | A21B 1/48 426/549 |
| 2005/0142267 A1 * | 6/2005 | Fasshauer | ............... | B26D 7/10 426/518 |
| 2008/0000337 A1 * | 1/2008 | Dickover | ............... | B26D 1/0006 83/651 |
| 2011/0179932 A1 * | 7/2011 | Wilhelm | ............... | B26D 1/0006 83/676 |

FOREIGN PATENT DOCUMENTS

| | | |
|---|---|---|
| DE | 19807497 A1 | 8/1999 |
| EP | 0407883 A1 | 1/1991 |
| EP | 0437643 A1 | 7/1991 |
| EP | 1445077 A1 | 8/2004 |
| JP | H05000066 A | 1/1993 |
| JP | H05304888 A | 11/1993 |
| JP | H07237182 A | 9/1995 |
| JP | 2005313299 A | 11/2005 |
| JP | 2013212098 A | 10/2013 |

* cited by examiner

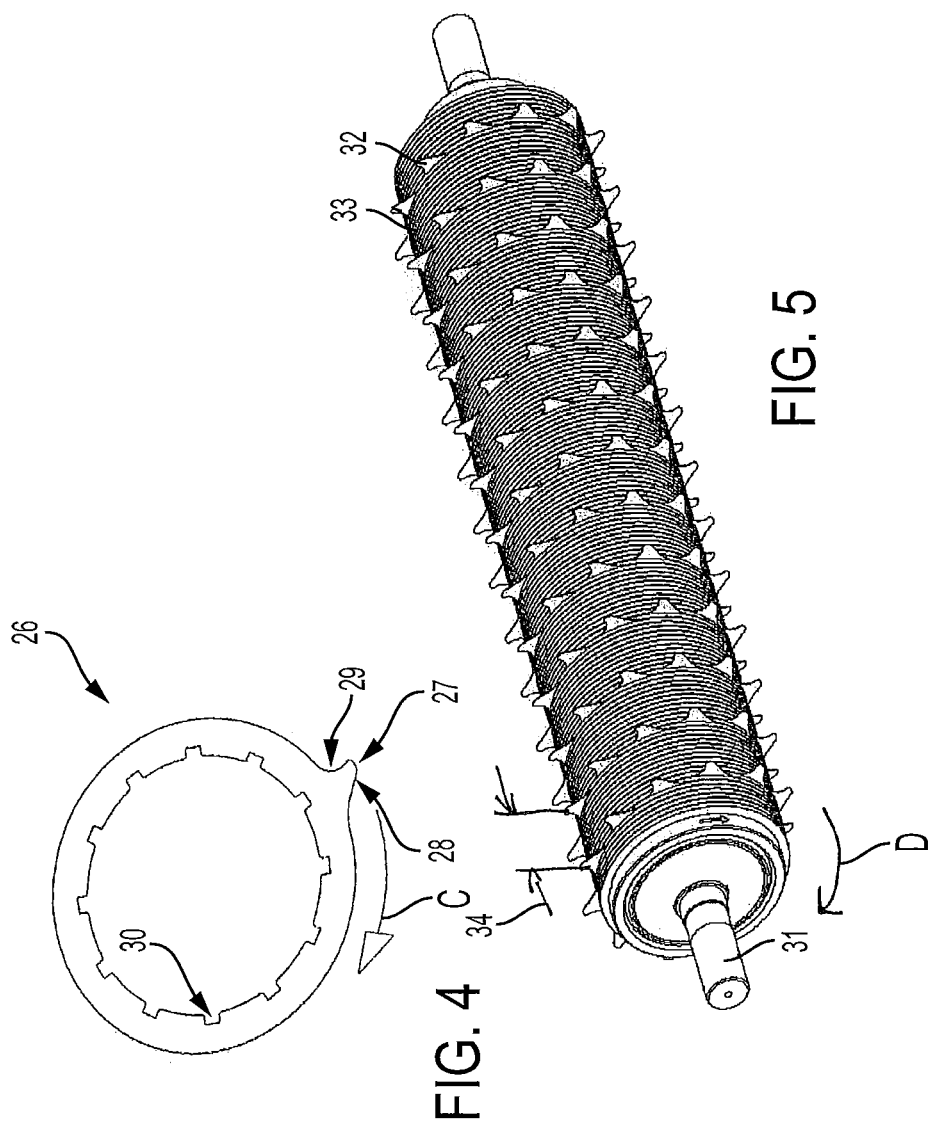

CUTTING OF A SOFT FOOD MASS

The invention relates to a method for cutting a soft food mass, in particular for cutting machine-processed cheese, such as processed cheese or mozzarella, which is present as a broad food ribbon of small ribbon thickness, whereby the food ribbon is fed by means of a conveyor belt with a travel speed leading to a longitudinal cutting device, in particular a cutting roller, which cuts the food ribbon with axially arranged cutting disks into parallel longitudinal strips, whereby the direction of rotation of the cutting roller corresponds to the travel direction of the food ribbon. In addition, the invention relates to a device for implementing the method.

In general, the longitudinal cutting of such broad food ribbons, in particular also of processed cheese, is known from a series of documents. By way of example, reference can be made to DE-OL 2 161 211, in which it is disclosed how a broad processed cheese ribbon is cut into a corresponding number of more narrow longitudinal strips by means of cutting disks that are arranged at preset intervals on an axis.

Similar devices are known from U.S. Pat. No. 5,601,855. There, i.a., cutting rollers are disclosed that run on opposing rollers with smooth surfaces or others whose cutting disks are interlocked. It is common to all of these devices that the peripheral speed of the cutting rollers corresponds approximately to the travel speed of the conveyor belt and that the paste-like processed cheese or the soft mozzarella strongly tends to adhere to the cutting rollers because of its sticky consistency. In this case, in order to be able to ensure that the cut food ribbons are not wound up with the cutting rollers, means are necessary that are designed as scraping combs and that grip with fingers between the cutting disks and pull the sticky product out from between the cutting rollers. In this method, the support contact between the cutting disks and the comb arrangement, on the one hand, and the food product, on the other hand, is comparatively intensive, so that these elements become heavily contaminated. The parts therefore often have to be exchanged and cleaned, which results in a reduction of the service life.

The object of this invention is now to provide a method and a corresponding device for longitudinal cutting of a soft food ribbon, whereby method and device can be implemented with technically simple means and can lead to long service lives with low maintenance.

These objects are achieved by the method with the characterizing features of Claim 1 and the device according to claim 7. Special embodiments are named in the respective subclaims.

The essential idea of the invention is that the soft food ribbon (also "product" below), in particular the processed cheese or mozzarella that is present as a flat ribbon, is not cut as before with slow-running cutting disks with a smooth cutting action but rather "saws" with quick-running serrated longitudinal cutting disks, whereby in this case, this is not a machining process in the conventional sense. To this end, the longitudinal cutting disks are equipped with one or with several teeth. The tooth or teeth are designed in this case so that they offer the smallest possible support surface to the product and cleave the food ribbon almost "exclusively" with the tips of their teeth.

The direction of rotation of the cutting roller that is equipped with serrated longitudinal cutting disks, or "cutting sheets," is in the travel direction of the product. The rotational or peripheral speed is advantageously adjustable and can thus be matched to the respective requirements. It has proven to be advantageous to adjust the peripheral speed of the cutting rollers so that the tip of the tooth moves through the food at more than 1.2× or twice the travel speed, in particular at a speed that is between 3× and 5× the travel speed. In comparison to the travel speed, the peripheral speed advantageously can be adjusted so that an integral slot is produced in the product.

According to the invention, the longitudinal cutting disks have blades that are provided with one or more teeth, in particular about 10 teeth, and their tooth height is greater than the thickness of the product, so that the teeth should not be completely immersed into the food mass up to the tooth base. The peripheral speed of the cutting roller is adjusted so that the tip of the tooth moves relative to the moved product, and the slot that is introduced into the moving food ribbon as a result produces a predetermined slot length, whereby the slot that is created by the subsequent tooth, which can also be the same tooth in the case of one tooth, at least almost directly adjoins the preceding slot. In this case, "directly" does not mean that an overlapping of two slots cannot also occur; the subsequent tooth thus engages in the slot of the previous one. It may even be useful for certain products to be able to stand briefly in incompletely cut-through bridge areas between subsequent slots so that a certain cohesion remains between two parallel longitudinal strips. This cohesion can optionally facilitate the additional processing, since parallel longitudinal strips cannot change their position relative to one another because of the hold.

The longitudinal cutting disks that are serrated according to the invention have the significant advantage that the contact between the disks and the product during cutting is interrupted in the meantime, so that the friction between the longitudinal cutting disks and the product is greatly reduced. Moreover, in the cutting disks that are arranged in parallel at a small distance, the clamping surface that is effective for the product is limited to a minimum. In contrast to the known cutting disks with smooth cuts, which separate the product by strong displacement, the surface of the longitudinal cutting disks that is reduced according to the invention leads to a reduction of the product displacement and thus also to preventing undesired product compression.

In this case, it has been shown that despite higher speeds, which on the periphery of the cutting disks can reach essentially more than 4× the travel speed, only a low tensile force is exerted on the product and, correspondingly, there is only a slight tendency that the product is torn during cutting. Because of the gentle treatment, the system is considerably less susceptible to interference with respect to the formation of folds in the product and to the dissolved product components, which are transported through the cutting system on the product belt.

Since the product in this type of cutting processing according to the invention can no longer wind around the cutting roller, it is possible to completely dispense with the previously required scraping comb. In addition to the design simplification, still other advantages accompany the elimination: in particular, the friction between the front surfaces of the cutting disks and the "comb teeth" as well as between the top of the product and the comb bottom facing the product is eliminated. With the friction that is significantly reduced overall between the product and the processing means, breadcrumb formation is greatly reduced. This fact contributes to the fact that the requirements on hygiene can easily be sufficient with low purification effort. Alone, the reduced number of components ultimately reduces the purification effort.

Moreover, a reduction of the friction accompanies a corresponding reduction of the torque of the drive shafts and thus the mechanical effort as well as the costs. To reduce the friction still further, the cutting disks that are manufactured in the art from metal, in particular from stainless steel, are coated with a repellent material, for example a plastic, such as PTFE or FEP, in an especially advantageous embodiment.

In another advantageous embodiment, the serrated cutting disks that are arranged on the common shaft are oriented such that the teeth of adjacent cutting disks are arranged with their teeth offset to one another. In this way, the contact with the product can be even further reduced. In particular, it has proven advantageous to arrange in an offset manner a cutting disk between two cutting disks that are arranged similarly, whereby their teeth in each case lie amidst the tooth gaps of the adjacent cutting disks, so that an offset arrangement with a ½ tooth spacing is achieved. With this offset arrangement, the clamping surface between two parallel cutting disks is especially efficiently reduced. Moreover, the detaching force that acts on the product, which acts when the tooth comes up onto the product that is on the conveyor belt, is at least partially offset by the compressive force of the adjacent tooth that is plunging into the product or resting on it. Another essential advantage of the offset arrangement is that the product can deviate during the cutting process, i.e., during the product displacement caused by the tooth in the already present parallel cut gap. This effect also reduces the risk of adhesion to the cutting disks.

It is advantageous, moreover, relative to the design of the cutting roller, to allow as great a variability as possible. To this end, the latter is not designed integrally but rather built up modularly in as much as a number of individual cutting disks are stacked on a common shaft in parallel and at a distance that is matched to the desired product width. Correspondingly wide spacers are then provided between parallel cutting disks. Also, the outside diameter of the spacers can be matched with respect to the product thickness that is to be expected. By the modular design, a significant reduction of the cost of conversion when there is a change in the size of the product that is to be manufactured is provided.

In this case, the components, such as the spacers and the cutting disks, can be selected separately and independently from the building block of the cutting roller. Thus, by changing the spacers to the same cutting rollers, product strips of any width can be cut, whereby only those small widths of the longitudinal strips of down to 2 mm can be cut. No limits are placed on excessive strip widths. Altogether, the ratio of free product passage and the groove depth between two cutting disks can be optimally matched. In addition to the advantage of the great variability with respect to the product widths, the modular design makes it possible to separate the cutting rollers into individual parts that are easy to clean. Another advantage is also that the exchange of individual cutting disks is possible in the case of repair.

The modular design is primarily also promoted in that no fingers of a comb engage in the grooves between the cutting disks, No specific distances from the comb thus need to be maintained, so that the packet of cutting disks and spacers stacked on the shaft has a comparatively high dimensional tolerance. Even a summation of the thickness tolerances of the number of stacked elements does not necessarily run into problems. Because of the lower structural requirements, this greater tolerance produces considerable cost advantages.

A great variation of the product dimensions relative to width and thickness is ultimately provided by the elimination of the comb. The cutting roller according to the invention allows a variation of up to 4× the product thickness, while the previous comb-equipped devices had almost no flexibility. Moreover, the longitudinal cutting disks can be matched to the product. Thus, various thicknesses of the cutting disks are possible, which in the case of processed cheese can vary from a ribbon thickness of about 2 mm, for example between 0.3 mm and 0.8 mm. Also, the tooth shape and the number of teeth are variable and are advantageously matched to the special product. The teeth can also have toothbrushes that are ground sharply on one or both sides.

To achieve an extended arc-shaped contact of the tooth of the cutting disk with the conveyor belt or the subjacent axially parallel counterpressure roller and therefore with the product, the conveyor belt can be raised in the intake area by one unit, in particular by about 0.5 mm to 2 mm. This can result in a reduction of the peripheral speed of the cutting disk by about 30%.

An especially advantageous application for the longitudinal cutting of a cheese belt into narrow longitudinal strips, according to the invention, is the production of small cheese cubes or sticks. The effect of this is a subsequent cross-cutting of the narrow longitudinal strips. The cheese ribbon itself can also be produced just before longitudinal cutting by a shaping device, whereby the latter in particular has rollers or steel belts that roll the heated liquid product up to the cheese ribbon and cool the latter to below room temperature, for example to a temperature of between 6° C. and 10° C. until its soft or paste-like consistency is produced. Advantageously, such a product line is designed to generate cubes or sticks in such a way that the product rests on a conveyor belt during the entire longitudinal cutting process until just before cross-cutting. Thus, on the one hand, product transfers from the wide, longitudinally cut product belt and, on the other hand, negative effects on the product by friction forces on the product surface as well as buckling are avoided.

Depending on the application, it may be useful to equip the cutting disks with a one-toothed or multi-toothed blade. The variant with only one tooth per cutting disk has the advantage that with the offset arrangement of the teeth of adjacent cutting disks, there is an even greater lateral distance from the tooth that is to plunge in next. On the other hand, the cutting disks can be more narrowly packed so that even especially narrow strips can be cut easily. Finally, there is this: the larger the lateral distance, the smaller the risk of the product belt becoming jammed or being pulled up. Overall, the product rests better on the conveyor belt.

In the case of the one-toothed variant, however, a higher peripheral speed than in the multi-toothed variant can be provided to produce an integral section. It has turned out, however, that such a higher cutting speed is also accompanied by a better cutting function. In particular, the cutting with the one-toothed variant results in an improved separation in the product, in particular if the latter, like mozzarella, is especially fibrous. It has also proven advantageous that in the one-toothed variant, lower tensile force is introduced into the product, and the product thus experiences a smoother treatment. Also, the fact that less friction between tooth and product is produced with one tooth contributes to gentler treatment. Since one tooth is always immersed in the same section, breadcrumb formation is reduced. Overall, the cross-sectional image is considerably improved, which increases the attractiveness of the product There is also another advantage in that the cutting roller can be cleaned more easily because of the smaller number of teeth.

BRIEF DESCRIPTION OF THE DRAWINGS

Below, the invention is explained in more detail based on FIGS. 1 to 3. Here:

FIG. 4 shows: a cutting sheet that is provided with one tooth, and

FIG. 5 shows: a cutting roller with one-toothed cutting sheets.

FIG. 1 first shows a section through cutting roller 1, one roller body 2 with a shaft journal 3 that is arranged on the front. This cutting roller 1 is driven by means of a gear on a gear rim 4 that is arranged on one side. The cutting roller 1 that is shown here has a sectional width of about 550 mm with a diameter of about 150 mm, and it cuts a flat cheese ribbon of this width into longitudinal strips of approximately 3 mm in width. Approximately 180 cutting disks 5 are correspondingly applied to the roller body 2 and are separated from one another by spacers 6 (FIG. 1a) that are also applied to the roller body 2. Such a cutting disk 5 is shown in FIG. 2.

Figure 1:
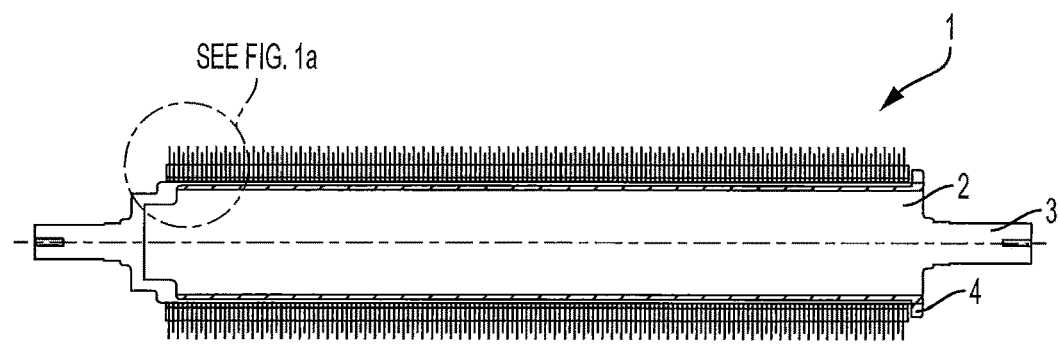
FIG. 1 shows: a section through a cutting roller.
Figure 1A:
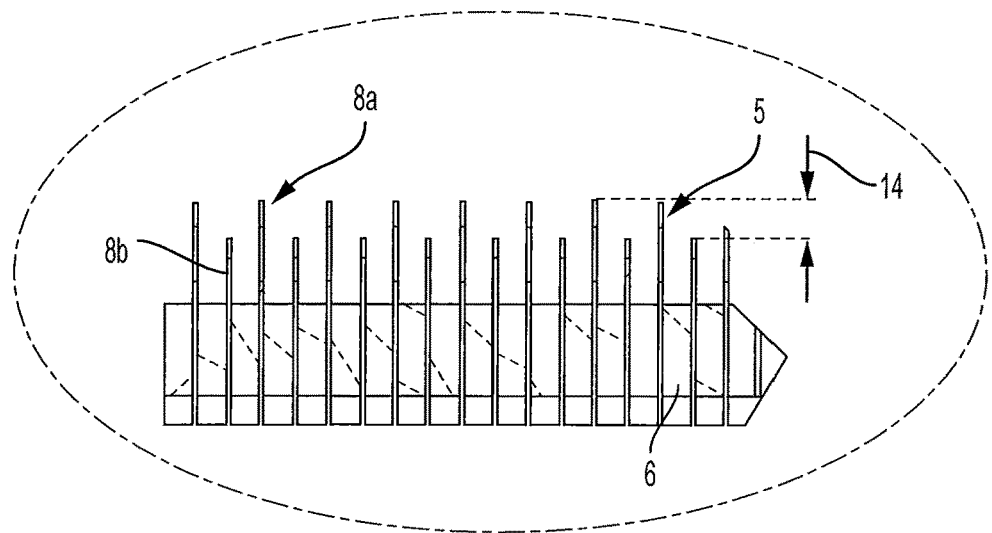
Figure 2:
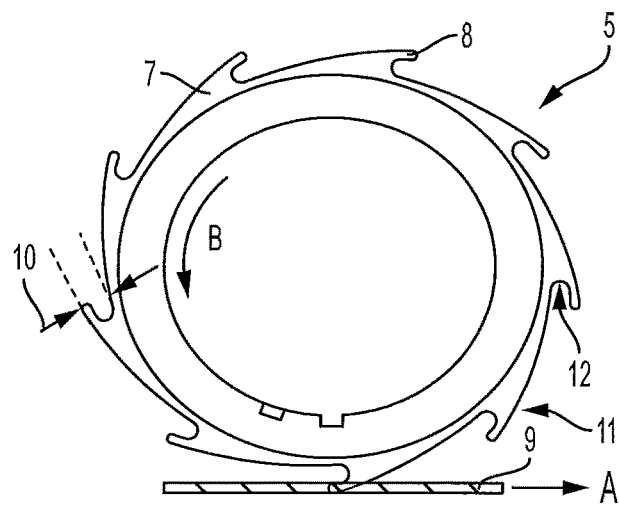
FIG. 2 shows: a cutting sheet that is provided with one tooth.

Nine cutting teeth 7 that are distributed over the periphery and that only penetrate the tips 8 of the teeth in the product 9 and in this case "split" the product 9 to a specific length can be seen clearly. The travel direction of the product 9 is identified with arrow A, and the direction of rotation of the cutting roller 1 is identified with the arrow B. The cutting teeth 7 of the cutting disk 5 have a tooth height 10 that is greater than the thickness of the product 9, so that the cutting teeth only penetrate the tips 8 of the teeth in the product. The driving means that acts on the gear rim 4 drives the cutting roller at a track speed that is measured at the periphery and that corresponds to at least twice the travel speed. Because of the convex-curved toothbrush 11, the cutting teeth have a comparatively small cutting angle in comparison to the moving product. So that the contact with the product is reduced to a minimum, the backs 12 of the teeth of the cutting teeth 7 have a clearly concave curvature.

It can also be seen from FIG. 1 at the different heights of the tips 8a and 8b of the teeth that adjacent cutting disks 5a and 5b with their cutting teeth 5 are arranged offset to one another by a ½ tooth spacing, in such a way that teeth of one cutting disk in each case lie amidst the tooth gaps of the adjacent cutting disk. Cutting disks 5 and spacers 6 are stacked alternately on the roller body 2 and are held snugly via a groove 13 on a border that is provided on the periphery of the roller body. The gap depth 14 of the tips 8 of the teeth on the outside diameter of a spacer 6 is approximately 12 mm. The spacers 6 have a thickness of three mm, such that with this device, product strips of this width are cut.

Figure 3:
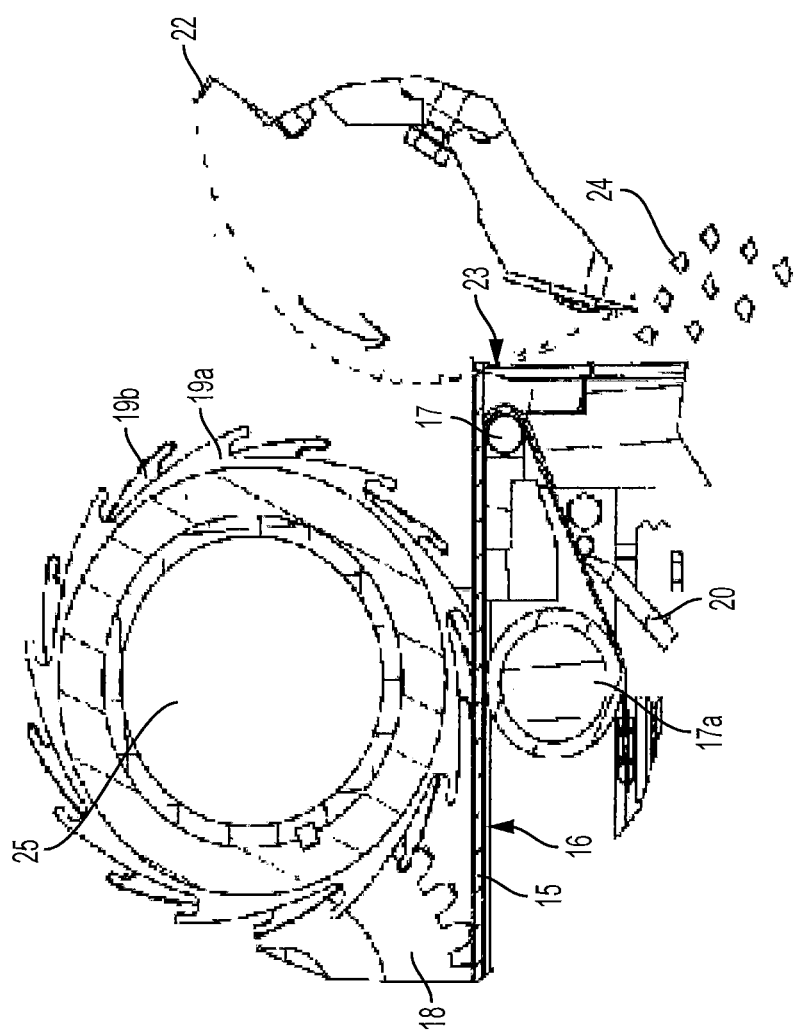
FIG. 3 shows: a portion of a device for cutting processed cheese.

In FIG. 3, a portion of a device for cutting the paste-like processed cheese that is formed in a flat ribbon 15 is shown that cuts the latter into a number of parallel longitudinal strips. The processed cheese 15 is conveyed at travel speed on a conveyor belt 16, which runs over drive and deflection rollers 17. Below the conveyor belt 16, a scraping device 20 is arranged that cleans adhesive product from the surface of the conveyor belt 16.

A cutting roller 25, which has a number of cutting disks 19 that are arranged axially at intervals, is arranged on the conveyor belt 16. Drive means 18 in the form of a gear drive the cutting roller 25. Also here, the offset arrangement of the teeth of the cutting disks 19a and 19b can be seen around a ½ tooth spacing. The complete cutting roller 25 is located over the product ribbon 15 and can be pivoted out to the operating side for cleaning and for format change with little effort by means of a pivoting frame. The teeth of the cutting disks 19 are dimensioned such that they reach up to the conveyor belt 16. The axis of the cutting roller 25 is arranged in such a way that the deflection roller 17a offers a thrust bearing to the cutting roller 25. Driving is done via an axially parallel drive shaft, whereby the torque is introduced into the cutting roller 25 via a gear pair.

In this case, a cross-cutting device 21 that rotates in the direction of the arrow is arranged just behind the cutting roller 25. The latter has shear blades 22 that shear off product 15, now cut into strips, over an edge 23. The individual product cubes 24 then fall into a corresponding vessel.

FIG. 4 shows a cutting sheet 26 that is provided with a tooth, whereby the direction of rotation is symbolized by the arrow C. One tooth 27 of the cutting sheet 26 has a steeper but convex-curved toothbrush 28 in comparison to the teeth 7 and a tooth back 29 that is only slightly concave. The cutting sheet 26 is held snugly on a shaft by means of grooves 30 that are arranged on the inner periphery.

FIG. 5 shows a cutting roller with a shaft 31 on which a number of closely packed one-toothed cutting sheets are "threaded" and are held snugly in the described way. It can be clearly seen that the offset arrangement of the teeth 32 and 33 results in two adjacent cutting sheets that causes these two teeth to follow one another in the direction of rotation (arrow D), and an enlarged lateral distance 34 is present between two simultaneously immersing teeth.

The invention claimed is:

1. A longitudinal cutting device for cutting a food that is in the form of a flat ribbon into a number of parallel longitudinal strips comprising:
    (a) a longitudinal cutting system (1, 25) comprising multiple coaxially arranged serrated cutting disks (5) mounted in a fixed relationship to each other for cutting a flat ribbon of a food into a number of parallel longitudinal strips, wherein
        (1) each serrated longitudinal cutting disk (5) has at least one cutting tooth (7, 27) and
        (2) the at least one cutting tooth (7, 27) of each serrated longitudinal cutting disk (5) is radially offset relative to the at least one cutting tooth (7, 27) of each next adjacent serrated longitudinal cutting disk (5) to reduce clamping of a food mass between adjacent serrated longitudinal cutting disks (5);
    (b) a driving device capable of transferring rotational force to the longitudinal cutting system for rotating the longitudinal cutting system about the axis of the coaxially arranged serrated cutting disks (5); and
    (c) a conveyor, wherein the conveyor is arranged to have a travel direction parallel to the axially arranged serrated cutting disks (5) and proximal to, or in contact with, the tooth tip (8) of each serrated longitudinal disk (5) when the longitudinal cutting system (1, 25) is rotated,
    wherein each serrated cutting disk (5) of the longitudinal cutting system has a cutting direction parallel to the travel direction of the conveyor.

2. The longitudinal cutting device according to claim 1, wherein each serrated longitudinal cutting disk (5) has only one cutting tooth (7, 27).

3. The longitudinal cutting device according to claim 1, wherein each serrated longitudinal cutting disk (5) comprises multiple cutting teeth (7, 27).

4. The longitudinal cutting device according to claim 1, wherein each cutting tooth (7, 27) has a convex tooth face (11).

5. The longitudinal cutting device according to claim 1, wherein each cutting tooth (7, 27) has a concave tooth back (12).

6. The longitudinal cutting device according to claim 5, wherein each cutting tooth (7, 27) has a concave tooth back (12).

7. The longitudinal cutting device according to claim 1, wherein the conveyor is arranged to have a travel direction parallel to the axially arranged serrated cutting disks (5) and proximal to, or in contact with, the tooth tip (8) of each serrated longitudinal disk (5) when the longitudinal cutting system (1, 25) is rotated.

8. A system comprising the longitudinal cutting device according to claim 1 and a shaping device associated with the conveyor, wherein the shaping device comprises steel belts suitable for shaping and cooling a liquid cheese product into a ribbon having a soft or paste-like consistency.

9. A system for cutting a soft food ribbon into cubes or sticks comprising the longitudinal cutting device according to claim 1 and a cross-cutting device proximal to the conveyor of the system for cutting a soft food ribbon into a number of parallel longitudinal strips, wherein the cross-cutting device is suitable for cross-cutting parallel longitudinal strips formed by the system to form cubes or sticks as the longitudinal strips are advanced by the conveyor.

10. A system for cutting a soft food ribbon into cubes or sticks comprising the system for cutting a soft food ribbon into a number of parallel longitudinal strips according to claim 8 and a cross-cutting device proximal to the conveyor, wherein the cross-cutting device is suitable for cross-cutting parallel longitudinal strips formed by the longitudinal cutting device to form cubes or sticks as the longitudinal strips are advanced by the conveyor.

* * * * *